US011417442B2

(12) United States Patent
Hugener et al.

(10) Patent No.: US 11,417,442 B2
(45) Date of Patent: Aug. 16, 2022

(54) FIELD GRADING MEMBERS, CABLES HAVING FIELD GRADING MEMBERS, AND METHODS OF MAKING FIELD GRADING MEMBERS

(71) Applicant: Hamilton Sundstrand Corporation, Charlotte, NC (US)

(72) Inventors: Theresa A. Hugener, Coventry, CT (US); Peter J. Walsh, Wethersfield, CT (US); Haralambos Cordatos, Colchester, CT (US)

(73) Assignee: HAMILTON SUNDSTRAND CORPORATION, Charlotte, NC (US)

(*) Notice: Subject to any disclaimer, the term of this patent is extended or adjusted under 35 U.S.C. 154(b) by 0 days.

(21) Appl. No.: 16/671,949

(22) Filed: Nov. 1, 2019

(65) Prior Publication Data

US 2021/0134476 A1  May 6, 2021

(51) Int. Cl.
| | |
|---|---|
| *H02G 15/18* | (2006.01) |
| *H01B 1/08* | (2006.01) |
| *H01B 7/00* | (2006.01) |
| *H01B 9/00* | (2006.01) |
| *H01B 9/02* | (2006.01) |
| *H01B 13/00* | (2006.01) |

(52) U.S. Cl.
CPC ............. *H01B 1/08* (2013.01); *H01B 7/0009* (2013.01); *H01B 9/003* (2013.01); *H01B 9/006* (2013.01); *H01B 9/027* (2013.01); *H01B 13/0036* (2013.01)

(58) Field of Classification Search
CPC ......... H02G 15/184; H01C 7/102; C08K 3/08
See application file for complete search history.

(56) References Cited

U.S. PATENT DOCUMENTS

| | | | | | |
|---|---|---|---|---|---|
| 3,551,356 | A | * | 12/1970 | Bowman | ............... C01G 9/02 252/519.53 |
| 4,373,013 | A | * | 2/1983 | Yoshizumi | ............... B41M 5/20 106/437 |
| 5,316,846 | A | * | 5/1994 | Pinsky | ............... B32B 17/04 428/325 |
| 6,124,549 | A | | 9/2000 | Kemp et al. | |

(Continued)

FOREIGN PATENT DOCUMENTS

| | | |
|---|---|---|
| WO | 2012030363 A1 | 3/2012 |
| WO | 2018234522 A1 | 12/2018 |

OTHER PUBLICATIONS

Christen, et al. "Nonlinear Resistive Electric Field Grading Part 1: Theory and Simulation", DEIS Feature Article, Nov./Dec.—vol. 26, No. 6, pp. 47-59, no year provided.

(Continued)

*Primary Examiner* — Chau N Nguyen
(74) *Attorney, Agent, or Firm* — Cantor Colburn LLP

(57) ABSTRACT

A field grading composite body includes a polymeric matrix and a particulate filler distributed within the polymeric matrix. Particles of the particulate filler include a core formed from a semiconductor material, an oxide mixed layer deposited on the core, and conducting oxide layer. The conducting oxide layer deposited on the oxide mixed layer to provide an electrical percolation path through the polymeric matrix triggered by strength of an electric field extending through the field composite body. Conductors and methods of making field grading composite bodies for conductors are also described.

11 Claims, 4 Drawing Sheets

(56) References Cited

U.S. PATENT DOCUMENTS

| | | | |
|---|---|---|---|
| 6,221,144 B1* | 4/2001 | Dietz | C08K 9/02 |
| | | | 106/415 |
| 6,469,611 B1 | 10/2002 | Kluge-Weiss et al. | |
| 7,170,004 B2 | 1/2007 | Gramespacher et al. | |
| 7,288,217 B2* | 10/2007 | Hareyama | C08K 9/02 |
| | | | 106/428 |
| 7,361,836 B2* | 4/2008 | Goehlich | H02G 15/003 |
| | | | 174/74 R |
| 7,868,079 B2 | 1/2011 | Önneby et al. | |
| 7,923,500 B2 | 4/2011 | Siegel et al. | |
| 9,424,967 B2 | 8/2016 | Gröppel et al. | |
| 9,666,334 B2 | 5/2017 | Josefsson et al. | |
| 2005/0253117 A1* | 11/2005 | Pfaff | C09C 1/0021 |
| | | | 252/500 |
| 2006/0097230 A1 | 5/2006 | Hareyama et al. | |
| 2006/0124339 A1 | 6/2006 | Goehlich | |
| 2008/0152898 A1 | 6/2008 | Donzel et al. | |
| 2012/0293964 A1 | 11/2012 | Greuter et al. | |
| 2014/0287175 A1 | 9/2014 | Krawiec et al. | |
| 2020/0169075 A1* | 5/2020 | Greb | B29C 45/0001 |

OTHER PUBLICATIONS

European Search Report for Application No. 20204302.2, dated Mar. 19, 2021, 124 pages.

* cited by examiner

FIELD GRADING MEMBERS, CABLES HAVING FIELD GRADING MEMBERS, AND METHODS OF MAKING FIELD GRADING MEMBERS

BACKGROUND

The present disclosure is generally related to electrical systems, and more particularly to regulating electric fields in electrical power distribution systems.

Power distribution systems, such as on aircraft, commonly include cabling to convey electric power to various electrical devices connected to the power distribution system. The cabling extends between terminations and joints interconnecting components of the system and generally includes a conductor sheathed within an insulator and reinforced with external shield. The shield typically extends continuously along the length of the insulation and is removed at the joints and terminations for purposes of mechanically connecting the cable to the joint or termination. Removal of the shield interrupts the effect that the shield otherwise provides to the electric field associated with electric current flowing through the cabling. The electric field extends radially through the insulator along the unshielded portion of the cabling and exerts stress on the insulator according to voltage.

In some electric systems the stress can potentially cause electrical breakdown of the insulator. To limit stress in such systems field grading device can be employed. For example, in high voltage systems, capacitive field grading devices like stress-cones can be attached to the unshielded portion of the cable to limit stress in the underlying insulator. In low and medium voltage applications resistive field grading devices cylindrical grading element with high conductivity, or field strength-dependent conductivity can be attached to the unshielded cabling portion. Such capacitive and resistive field grading devices limit electrical stress by distributing the electric field along the length of the unshielded portion of the cabling.

Such systems and methods have generally been acceptable for their intended purpose. However, there remains a need in the art for improved field grading members, cables, and methods of making field grading members.

BRIEF DESCRIPTION

A field grading member is provided. The field grading member includes a polymeric matrix and a particulate filler of particulate bodies distributed within the polymeric matrix. The particulate bodies of the particulate filler include a core formed from a semiconductor material, an oxide mixed layer deposited on the core, and a conducting oxide layer deposited on the oxide mixed layer to provide an electrical percolation path through the polymeric matrix triggered by strength of an electric field extending through the field grading member.

In addition to one or more of the features described above, or as an alternative, further examples of the field grading member may include that the semiconductor material forming the cores of the particulate bodies is a semiconductor oxide.

In addition to one or more of the features described above, or as an alternative, further examples of the field grading member may include that the semiconductor material forming the cores of the particulate bodies is zinc oxide.

In addition to one or more of the features described above, or as an alternative, further examples of the field grading member may include that the semiconductor material forming the cores of the particulate bodies includes unincorporated oxygen.

In addition to one or more of the features described above, or as an alternative, further examples of the field grading member may include that the semiconductor material forming the cores of the particulate bodies includes a dopant.

In addition to one or more of the features described above, or as an alternative, further examples of the field grading member may include that the dopant within the cores of the particulate bodies consists essentially of fluoride ions.

In addition to one or more of the features described above, or as an alternative, further examples of the field grading member may include that the oxide mixed layer of the particulate bodies also includes an oxide of the semiconductor material forming the cores of the particulate bodies and that the conducting layer does not include the oxide of the semiconductor material forming the cores of the particulate bodies.

In addition to one or more of the features described above, or as an alternative, further examples of the field grading member may include that the oxide mixed layer of the particulate bodies consists of zinc oxide and tin oxide.

In addition to one or more of the features described above, or as an alternative, further examples of the field grading member may include that the conducting layer of the particulate bodies consists of tin oxide.

In addition to one or more of the features described above, or as an alternative, further examples of the field grading member may include that the cores of the particulate bodies consist of zinc oxide, a dopant, and unincorporated oxygen; that the oxide mixed layers of the particulate bodies consist of zinc oxide and tin oxide; and that the conducting oxide layers of the particulate bodies consist of tin oxide.

A cable includes a conductor member, an insulator member extending about the conductor member, and a field grading member as described above. The field grading member abuts the insulator member and extends along a portion of the insulator member.

In addition to one or more of the features described above, or as an alternative, further examples of the cable may include that the cable has a shielded portion and an unshielded portion, a shield extending about the shielded portion of the cable and removed from the unshielded portion of the cable, and that the field grading member overlays the unshielded portion of the cable.

In addition to one or more of the features described above, or as an alternative, further examples of the cable may include a joint including the field grading member.

In addition to one or more of the features described above, or as an alternative, further examples of the cable may include a termination including the field grading member.

In addition to one or more of the features described above, or as an alternative, further examples may include that the cable electrically connects a high voltage power source to an electrical load.

A method of making a field grading member is additionally provided. The method includes receiving a particulate include two or more cores formed from a semiconductor material, depositing an oxide mixed layer on each of the two or more cores, depositing a conducting oxide layer on each of the oxide mixed layers of the cores, and distributing the particulate as a particulate filler within a polymeric matrix to form a field grading member.

In addition to one or more of the features described above, or as an alternative, further examples of the method may include that depositing at least one of the oxide mixed layer and the conducting oxide layer includes immersing the two or more cores in a metal halide solution.

In addition to one or more of the features described above, or as an alternative, further examples of the method may include doping the semiconductor material with halide ions contained within the metal halide solution, that depositing the oxide mixed layer also includes depositing an oxide of the semiconductor material and an oxide of the metal contained within the metal halide solution on the two or more cores, and that depositing the conducting oxide layer also includes depositing a metal oxide formed from the metal contained within the metal halide solution.

In addition to one or more of the features described above, or as an alternative, further examples of the method may include that depositing one or more of the oxide mixed layer and the conducting oxide layer also includes exposing the two or more cores to a humidified vapor phase of a metal halide.

In addition to one or more of the features described above, or as an alternative, further examples of the method may include, at a cable including a conductor member and an insulator member extending about the conductor member, fixing the field grading member about a portion of the insulator member to limit magnitude of an electric field extending through the insulator member and associated with current flow through the conductor member.

Technical effects of the present disclosure include field grading filler materials with relatively high non-linearity in the resistivity (or conductivity) as a function of electric field magnitude. Technical effects also include the capability to limit electric stress associated with relatively high voltage for a given filler fraction of field grading material. Technical effects also include the capability to limit electric stress for a given voltage with a relatively low filler fraction, limiting the impact that the filler could otherwise have on the structure formed from an insulating matrix and field grading filler material.

BRIEF DESCRIPTION OF THE DRAWINGS

The following descriptions should not be considered limiting in any way. With reference to the accompanying drawings, like elements are numbered alike.

DETAILED DESCRIPTION

Figure 1:
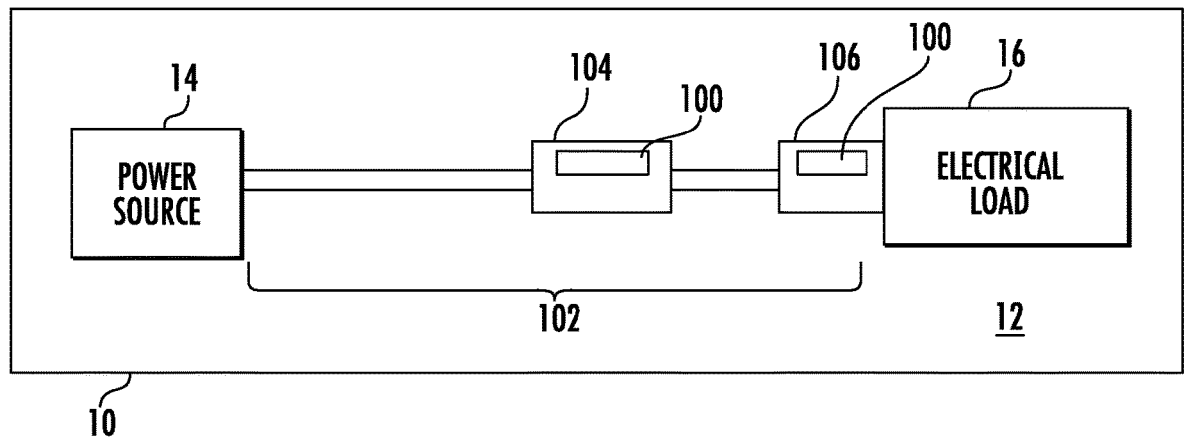
FIG. 1 is a schematic view of an electrical system having a cable constructed in accordance with the present disclosure, showing a field grading member having an insulating body and a particulate filler formed from composite bodies disposed within the insulating body.

Reference will now be made to the drawings wherein like reference numerals identify similar structural features or aspects of the subject disclosure. For purposes of explanation and illustration, and not limitation, a partial view of an example implementation of a field grading member constructed in accordance with the disclosure is shown in FIG. 1 and is designated generally by reference character 100. Other examples of field grading members, cables having field grading members, and methods of making field grading members and cables in accordance with the present disclosure, or aspects thereof, are provided in FIGS. 2-6, as will be described. The systems and methods described herein can be used for regulating electrical stress in cables communicating electrical power, such as high voltage power distribution systems on aircraft, though the present disclosure is not limited to aircraft or to high voltage power distribution systems in general.

Referring to FIG. 1, a vehicle 10, e.g., an aircraft, is shown. The vehicle 10 includes an electrical system 12 having a power source 14, an electrical load 16, and a cable 102. The cable 102 electrically connects the power source 14 to the electrical load 16 through one or more of a joint 104 and a termination 106. The joint 104 and/or the termination 106 include the field grading member 100 to regulate an electric field 18 (shown in FIG. 2) within the cable 102 that is associated with an electric current 20 flowing through the cable 102. Although shown and described herein as being part of the joint 104 or the termination 106 it is to be understood and appreciated that the field grading member 100 can also regulate electric fields in other structures of the cable 102, such as portions of the cable that have been repaired by way of non-limiting example. In certain examples the power source 12 can be a direct current (DC) power source and the cable 102 configured to communicate DC power, e.g., DC power at upwards of 6000 volts. It is also contemplated that the power source 12 can be an alternating current (AC) power source and that the cable 102 by configured to communicate AC power, e.g., upwards of 6000 volts.

Figure 2:
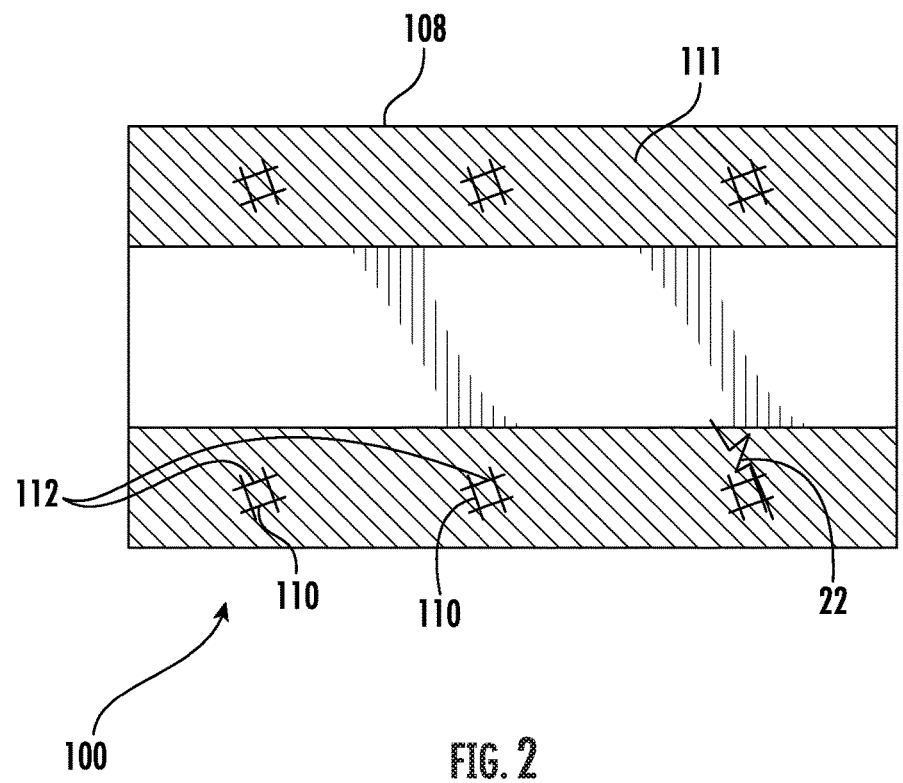
FIG. 2 is a schematic cross-sectional view of the field grading member of FIG. 1, showing the insulating body and composite bodies of particulate filler disposed within the insulating body to regulate an electric field associated with current flowing through the conductor member.

With reference to FIG. 2, the field grading member 100 is shown. The field grading member 100 includes polymeric matrix 108 and a particulate filler 110. The polymeric matrix 108 includes an electrically insulative polymeric material 111. Examples of suitable polymeric materials include ethylene diene rubber (EPDM) and silicone rubbers, and also thermoplastics such as polyethylene, polypropylene, and mixes thereof.

The particulate filler 110 is distributed within the polymeric matrix 108 and includes a plurality of particulate bodies 112. In certain examples the particulate bodies are composite particulate bodies 112 and in this respect are formed from one or more conductive material and one or more insulative or semiconducting material. In accordance with certain examples the field grading member 100 is generally cylindrical in shape. In accordance with certain examples the field grading member 100 can have a contoured shape, e.g., tapering along an axial length of the field grading member 100.

Figure 3:
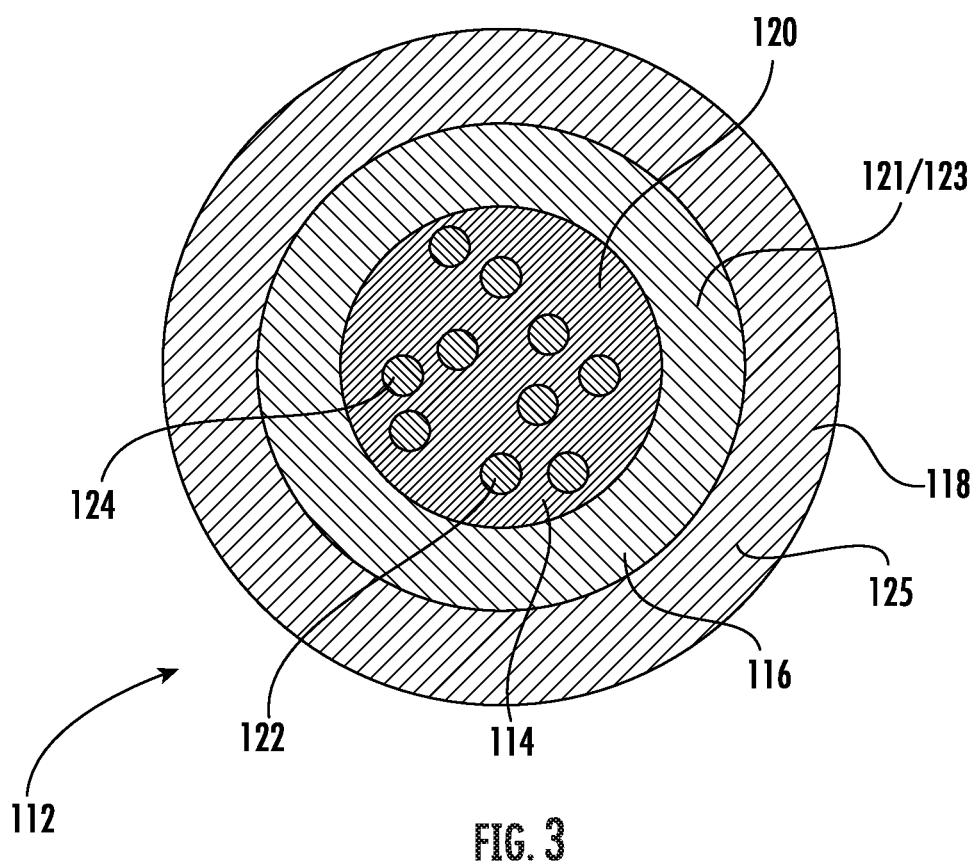
FIG. 3 is schematic cross-sectional view of a composite body forming the particulate filler of FIG. 1, showing a core with an oxide mixed layer and a conducting oxide layer deposited on the core.

With reference to FIG. 3, a particulate body 112 is shown according to an illustrative example. The particulate body 112 includes a core 114, an oxide mixed layer 116, and a conducting oxide layer 118. The core 114 is formed from a semiconductor material 120. The oxide mixed layer 116 is deposited on the core 114. The conducting oxide layer 118 is deposited on the oxide mixed layer 116 to provide an electrical percolation path 22 through the polymeric matrix 108 triggered by strength of the electric field 18 (shown in FIG. 4) extending through the field grading member 100.

In certain examples the semiconductor material 120 forming the core 114 includes a semiconductor oxide. In accordance with certain examples the semiconductor material 120 forming the core 114 includes zinc oxide. It is also contemplated that the semiconductor material 120 forming the core 114 can include unincorporated oxygen 122. In further examples the semiconductor material 120 forming the core 114 can include a dopant 124. In certain examples the dopant includes one or more dopants selected from a group including aluminum, gallium, nitrogen, and fluorine. In accordance with certain examples the dopant includes an ion selected from a group including one or more of aluminum ions, gallium ions, nitrogen ions, and fluoride ions. It is contemplated that, in accordance with certain examples, that the dopant consists of (or consist essentially of) fluoride ions.

The zinc oxide forming the core 114 provides high electron mobility, high thermal conductivity, and an N-type semi-conductive electrical transition of relatively wide band gap, e.g., on the 3.44 electron-volts. As will be appreciated by those of skill in the art in view of the present disclosure, semiconductors having relatively wide band gaps can operate at higher voltages, higher frequencies, and higher temperatures than semiconductor materials with smaller band gaps, such as silicon and gallium arsenide for example. Further, each vacancy within the zinc oxide forming the core 114 provides two (2) electrons, the number of vacancies within the core can be adjusted according to the technique used to form the core 114, and conductivity of the core 114 is sensitive (and therefore tunable) to surface modification.

In certain examples the oxide mixed layer 116 of the particulate body 112 include an oxide 121 of the semiconductor material 120 forming the core 114 of the particulate body 112. In accordance with certain examples the oxide mixed layer 116 of the particulate body 112 can include the oxide 121 of the semiconductor material 120 forming the core 114 of the particulate body 112 and another oxide 123. For example, it is contemplated that the oxide mixed layer 116 can consist, or consist essentially, of zinc oxide and tin oxide. Including a conducting oxide contained within a matrix of the mixed oxide layer enhances the electrical performance of the underlying core. Specifically, the conductive oxide in conjunction with the dopant (such as fluoride ions) helps move electric field relatively efficiently between particles within the insulting polymer matrix. The mixed oxide layer also affords an additional transport medium for electrons that helps extend beyond the electron transport properties of the semiconductor core.

In certain examples the conducting oxide layer 118 include an oxide 125 that does not include the oxide of the semiconductor material 120 forming the core 114 of the particulate body 112. In accordance with certain examples the conducting oxide layer 118 of the particulate body 112 consists, or consists essentially, of tin oxide. Advantageously, the conducting oxide layer 118 provides additional assistance in transport of electrons between particles to particle relative to the electron transport between semiconductor particles not having the conducting oxide layer 118.

In the illustrated example the core 114 of the particulate body 112 consists of zinc oxide, fluorides ions, and unincorporated oxygen. The oxide mixed layer 116 of the particulate body 112 consists of zinc oxide and tin oxide. The conducting oxide layer 118 of the particulate body 112 consists of tin oxide. Zinc oxide and other wide band gap oxide-based semiconductors are desirable due to the versatility of the temperature and voltage range that wide band gap semiconductors can operate in compared to non-wide band gap semiconductors. Without being bound by a particular theory, it is believed that conducting oxides within the conducting oxide layer 118 improve the charge transfer compared to using a semiconductor particle without the conducting oxide layer 118.

Figure 4:
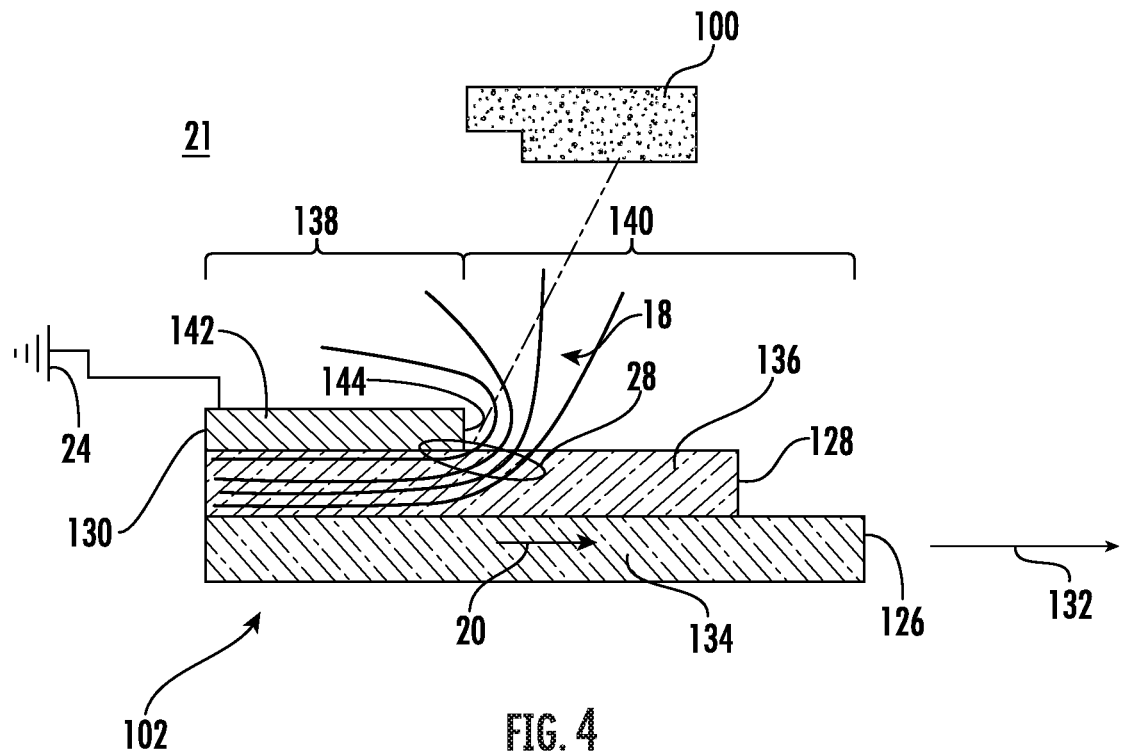
FIG. 4 is a schematic view of the cable of FIG. 1 according to an example implementation, showing distribution of an electric field within the insulator member associated with current flow through the conductor when the field grading member is spaced apart from the cable.
Figure 5:
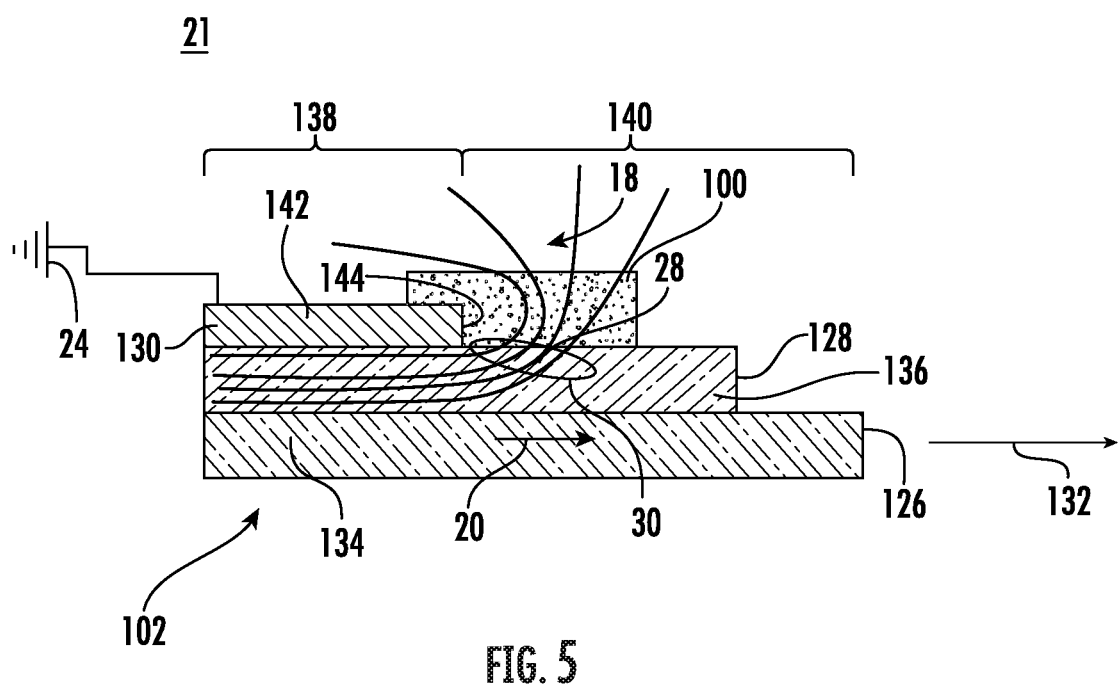
FIG. 5 is a schematic view of the conductor of FIG. 1 according to an example implementation, showing distribution of an electric field within the insulator member associated with current flow through the conductor when the field grading member abuts the cable.

With reference to FIGS. 4 and 5, the cable 102 is shown with the field grading member 100 spaced apart from the cable 102 and abutting the cable 102, respectively. The cable 102 is arranged to communicate the electric current 20 from the power source 14 (shown in FIG. 1) to the electrical load 16 (shown in FIG. 1) and includes a conductor member 126, an insulator member 128, and shielding 130.

The conductor member 126 extends along a conductor axis 132 and is formed from an electrically conductive conductor material 134. The conductor material 134 is selected to communicate the electric current 20 carried by the conductor member 126. The conductor material 134 can include copper or a copper alloy by way of non-limiting example.

The insulator member 128 extends along the conductor member 126, is fixed to the conductor member 126, and is formed from an electrically insulative insulator material 136. The insulator material 136 electrically isolates the conductor member 126 from the external environment 21 and is selected to accommodate the electric field 18 associated with the electric current 20 flowing through the conductor member 126. The insulator material 136 can include a cross-linked polyethylene material by way of non-limiting example.

The shielding 130 extends partially along the insulator member 128, is fixed along a shielded portion 138 of the cable 102, is removed (absent) from an unshielded portion 140 of the cable 102 and is formed from an electrically conductive shielding material 142. The shielding material 142 is selected to regulate the electric field 18 within the shielded portion 138 of the cable 102, e.g., by distributing the electric field 18 within the conductor member 126 and the insulator member 128. It is contemplated that the shielding 130 be electrically connected to a ground terminal 24.

As will be appreciated by those of skill in the art in view of the present disclosure, shielding the cable 102 with the shielding 130 can limit the electrical stress exerted by the electric field 18 on the insulator member 128 by controlling uniformity of the electric field 18 axially within the insulator member 128 along the shielded portion 138 of the cable 102. This is indicted schematically in FIG. 4 with the spacing shown between adjacent regulated electric field lines 26, which extend axially within the insulator member 128 and along the shielded portion 138 of the cable 102.

As will also be appreciated by those of skill in the art in view of the present disclosure, electrical stress exerted by the electric field 18 on the insulator member 128 within the unshielded portion 140 of the cable 102 can be greater than that within the shielded portion 138 of the cable 102. This is also indicted schematically in FIG. 4 with the spacing shown between adjacent unregulated electric field lines 28, which extend radially within the insulator member 128 and along the unshielded portion 140 of the cable 102. The electrical stress can be relatively high at a terminal location 144 of the shielding 130, varies in peak intensity according to voltage applied to the cable 102, and in some cables can be of magnitude sufficient to cause electrical breakdown of the insulator material 136 forming the insulator member 128. The field grading member 100 interacts with the electric field 18 to regulate the electrical stress within insulator member 128 associated with the electric current 20 flowing through the cable 102.

With reference to FIG. 5, the field grading member 100 is shown abutting the cable 102. When integrated into the cable 102 the insulator member 128 underlays the field grading member 100 (the field grading member 100 thereby overlaying the insulator member 128) and electrically separates the field grading member 100 from the conductor member 126. More specifically, the field grading member 100 overlays the unshielded portion 140 of the cable 102, the insulator member 128 thereby underlaying the field grading member 100 such that the field grading member 100 distributes the electric field 18 axially along the conductor axis 132. Distribution of the electric field 180, as indicated by the relatively large spacing between adjacent distributed regulated field lines 30 in relation to the unregulated field lines 28 (shown in FIG. 4), limits the electrical stress exerted on the insulator member 128 by the electric field 18. Limiting magnitude of the electrical stress in turn allows the insulator member 128 to be relatively small for a given voltage (and electric field magnitude) and/or have a higher voltage rating in comparison to cables not employing the field grading member 100.

Figure 6:
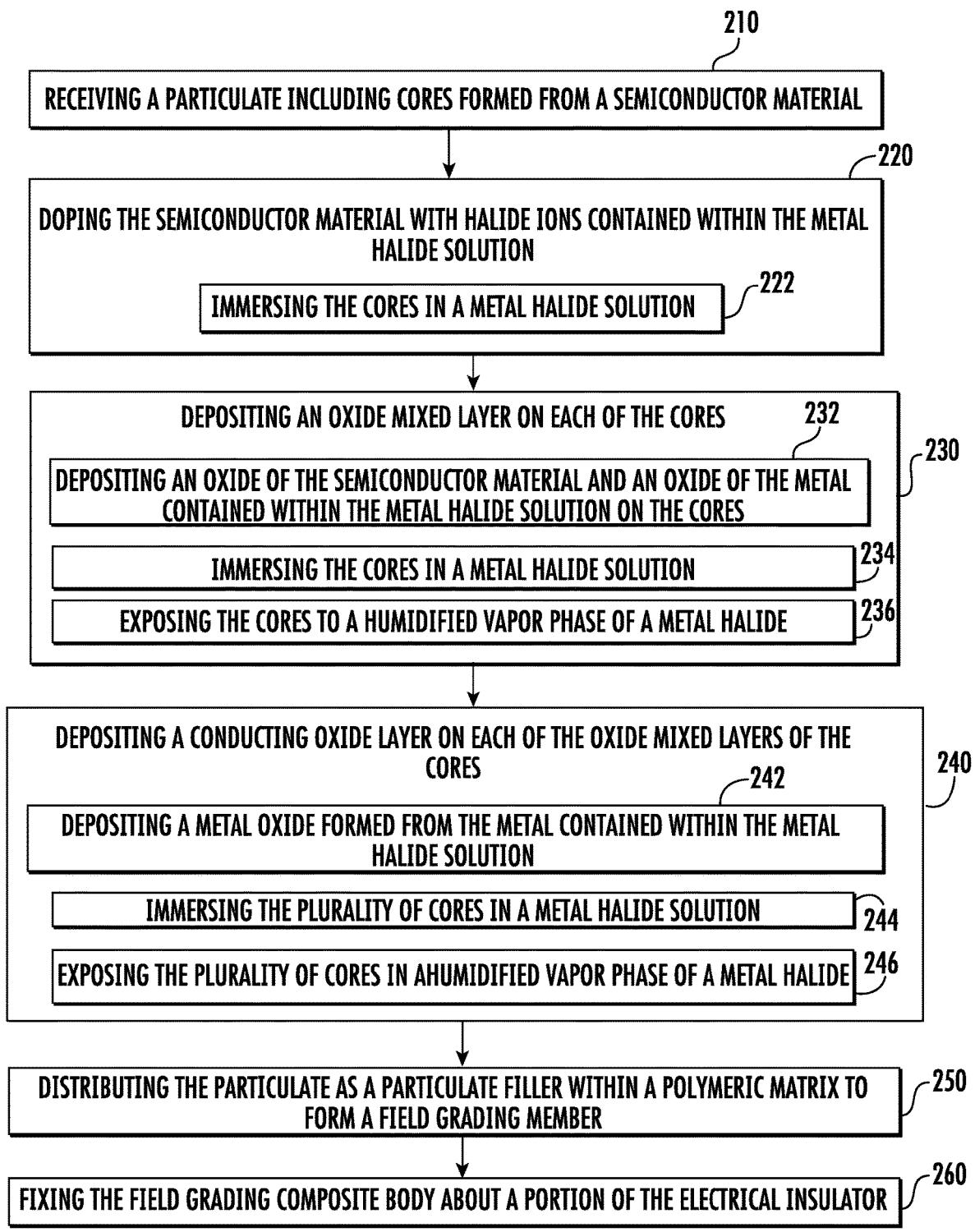
FIG. 6 is a process flow diagram of a method of making a field grading member for a cable, showing steps of the method according to an illustrative and non-limiting example of the method.

With reference to FIG. 6, a method 200 of making a field grading member is shown. As shown with box 210, the method 200 includes receiving a particulate including cores formed from a semiconductor material, e.g., cores 114 (shown in FIG. 3) formed from the semiconductor material 120 (shown in FIG. 3). The semiconductor material forming the cores is doped with halide ions, e.g., the dopant 122 (shown in FIG. 3), contained within a metal halide solution, as shown with box 220. Doping can be accomplished by immersing the cores in a metal halide solution or by exposing the cores to a humidified vapor phase of the metal halide, as shown with box 222.

As shown with box 230, an oxide mixed layer, e.g., the oxide mixed layer 116 (shown in FIG. 3) is deposited on each of the cores. In certain examples depositing the oxide mixed layer includes depositing an oxide of the semiconductor material and an oxide of the metal contained within the metal halide solution on the cores, as shown with box 232. Depositing the oxide mixed layer can be accomplished by immersing (or continuing to immerse) the cores in the metal halide solution or by exposing (or prolonging exposure) the cores to the humidified vapor phase of the metal halide, as shown with boxes 234 and 236.

As shown with box 240, a conducting oxide layer, e.g., the conducting oxide layer 118 (shown in FIG. 3) is deposited on the oxide mixed layer coating each core. In certain examples deposing the conducting oxide layer can include depositing a metal oxide formed from the metal contained within the metal halide solution, as shown with box 242. Depositing the conducting oxide layer can be accomplished by immersing the coated cores in a metal halide solution or by exposing the cores to a humidified vapor phase of the metal halide, as shown with boxes 244 and 246. The particles are thereafter disposed as a particulate filler within a polymeric matrix to form a field grading member, e.g., the field grading member 100 (shown in FIG. 1), as shown with box 250. The field grading member can in turn be fixed to a cable, e.g., the cable 102 (shown in FIG. 1), as shown with box 260.

Cable joints and terminations in electrical systems can require field grading to manage the electric field, and the associated potential for electrical breakdown, that could otherwise exist at the joint or termination. In high voltage electrical systems capacitive grading can be employed at the cable joint or termination, such as by fixation of a stress-cone formed from a two-part rubber composition and defining a profile selected for the electric field otherwise present at the cable joint or termination. In low and medium voltage electrical systems resistive grading can be employed at the cable joint and termination, such as be fixation of a cylindrical grading element with relatively high conductivity, which can be dependent upon field strength.

In examples described herein a composite body is employed to provide field grading at a cable joint or termination. The composite body includes an electrically insulating matrix and a semiconductor filler. The semiconductor filler is tailored, by incorporating therein a dopant, to provide electrical conductivity commensurate with strength of the magnetic field at the cable joint or termination. In certain examples the doped semiconductor filler has relatively high non-linearity and in this respect exhibits a rapid rate of adjustment to electric field strength change in comparison to field grading bodies not employing doped semiconductor fillers.

The term "about" is intended to include the degree of error associated with measurement of the particular quantity based upon the equipment available at the time of filing the application.

The terminology used herein is for the purpose of describing particular examples only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an example or examples, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular example disclosed as the best mode contemplated for carrying out this present disclosure, but that the present disclosure will include all examples falling within the scope of the claims.

What is claimed is:

1. A field grading member, comprising:
  a polymeric matrix; and
  a particulate filler distributed within the polymeric matrix, particulate bodies of the particulate filler each comprising:
    a core that includes a zinc oxide doped with fluoride ions;
    an oxide mixed layer deposited on the core; and
    a conducting oxide layer deposited on the oxide mixed layer to provide an electrical percolation path through the polymeric matrix triggered by strength of an electric field extending through the field grading member.

2. The field grading member of claim 1, wherein the dopant included within the cores of the particulate bodies consists essentially of the fluoride ions.

3. The field grading member of claim 1, wherein the oxide mixed layer of the particulate bodies includes zinc oxide, and the conducting layer does not include the zinc oxide.

4. The field grading member of claim 1, wherein the oxide mixed layer of the particulate bodies consists of zinc oxide and tin oxide.

5. The field grading member of claim 1, wherein the conducting layer of the particulate bodies consists of tin oxide.

6. The field grading member of claim 1, wherein the oxide mixed layers of the particulate bodies consist of zinc oxide and tin oxide; and wherein the conducting oxide layer of the particulate bodies consist of tin oxide.

7. A cable, comprising:
a conductor member;
an insulator member extending about the conductor member; and
a field grading member as recited in claim 1 abutting the insulator member, the field grading member extending along a portion of the insulator member.

8. The cable of claim 7, wherein the cable has a shielded portion and an unshielded portion, a shield extending about the shielded portion of the cable, the shield removed from the unshielded portion of the cable, wherein the field grading member overlays the unshielded portion of the cable.

9. The cable of claim 7, wherein the cable has a joint including the field grading member.

10. The cable of claim 7, wherein the cable has a termination including the field grading member.

11. The cable of claim 7, wherein the cable electrically connects a high voltage power source to an electrical load.

* * * * *